E. I. DODDS.
METHOD OF MANUFACTURING FLEXIBLE BOLTS.
APPLICATION FILED JAN. 16, 1915.
1,194,825.
Patented Aug. 15, 1916.
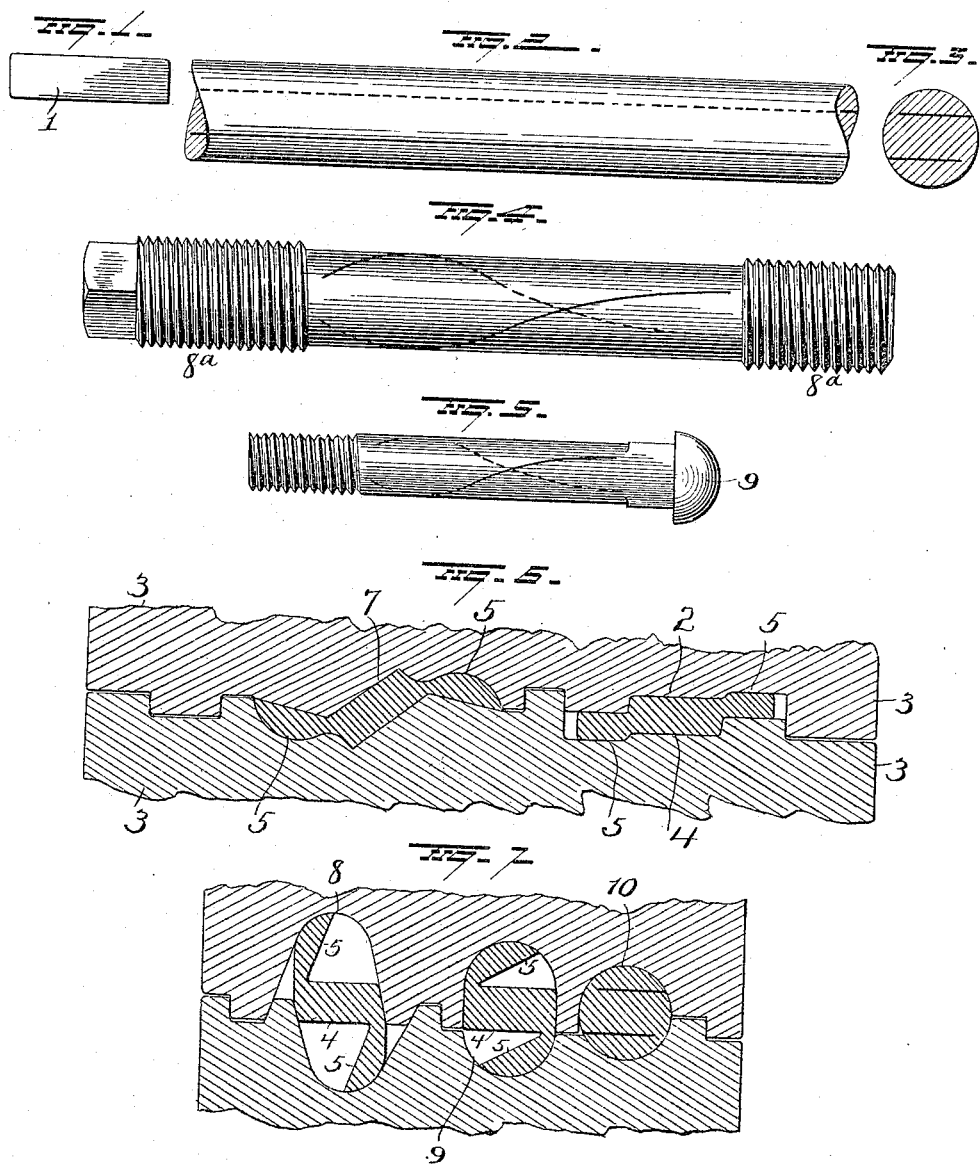

UNITED STATES PATENT OFFICE.

ETHAN I. DODDS, OF PITTSBURGH, PENNSYLVANIA, ASSIGNOR TO FLANNERY BOLT COMPANY, OF PITTSBURGH, PENNSYLVANIA.

METHOD OF MANUFACTURING FLEXIBLE BOLTS.

1,194,825.   Specification of Letters Patent.   Patented Aug. 15, 1916.

Application filed January 16, 1915. Serial No. 2,662.

*To all whom it may concern:*

Be it known that I, ETHAN I. DODDS, a citizen of the United States, and a resident of Pittsburgh, in the county of Allegheny and State of Pennsylvania, have invented certain new and useful Improvements in Methods of Manufacturing Flexible Bolts; and I do hereby declare the following to be a full, clear, and exact description of the invention, such as will enable others skilled in the art to which it appertains to make and use the same.

My invention relates to an improvement in method of manufacturing flexible bolts.

Heretofore flexible bolts for boilers and railroad track construction have been made of a plurality of independent members; or with a shank composed of a plurality of separated members or a cylindrical blank has been slotted or pierced part way through to produce the necessary flexibility. Tests and experiments have demonstrated that bolts made of a plurality of sections are not sufficiently rigid in all cases to withstand the strains and vibrations to which they are subjected in actual use, and the bolts which are slotted all the way through the shank between the heads are so flexible that it is difficult, and in some cases impossible to apply them properly to the boiler sheets. The bolts made from a cylindrical blank slotted or pierced part way through between the ends of the blank or bolt, or through the shank and one end, are more rigid than those above referred to and at the same time sufficiently flexible, consequently are superior to either of the other forms.

The object of this invention is to simplify the process of manufacturing bolts of the latter type, whereby the cost of manufacture will be greatly reduced and the output materially increased and it consists in an improved method of manufacturing the cylindrical blanks, whereby the operation of piercing or slotting by tools forced into the blank is dispensed with.

In the accompanying drawings, Figure 1 is a view of an end elevation of a slab or bar from which the blank is made; Fig. 2 is a view of the rod or blank made from the slab or bar; Fig. 3 is a view in cross section of the same; Fig. 4 is a view of a stay bolt threaded and twisted; Fig. 5 is a view of a track bolt made from the blank; Figs. 6 and 7 are views of the rolls for shaping the blank, and Figs. 8 and 9 are views in cross section of modified forms of blocks which may be made by the same process.

In the manufacture of the bolts, I take a slab or bar 1 of metal, preferably rectangular in cross section as shown in Fig. 1, and of any desired length, width and thickness, and heat it to a mellow rolling heat, and then run it through pass 2 of the rolls 3. The size of the slab or bar 1 used, will depend on the size of the bolts to be produced, which vary from about three quarters of an inch in diameter to one and one quarter inches. The passage of the slab through the first pass 2 of the rolls 3, spreads the slab transversely and reduces it at its two side edges, thus forming in effect a central body section 4 and two side wings 5, one of which is depressed so that its lower surface projects slightly below the lower surface of the body section, and the other elevated to project slightly above the top surface of said body as shown in Fig. 6. After the passage of the slab through pass 2, it is passed through pass 7, which curves or rounds one face of each wing 5, and bends the wings inwardly toward the body, leaving however, the two side faces of the body and the faces of the wings which are subsequently bent onto the body, straight and flat. After passing through pass 7 it is sent through passes 8 and 9 and 10 which reduce it to a cylindrical shape of the proper diameter. The meeting faces of the body and wings are not welded, so that after the formation of the round blank shown in Fig. 2, it has the same characteristics as a blank made from a solid rod pierced longitudinally part way through, the impiercements being at opposite sides of the center of the blank. After the bar of any convenient length has been thus shaped, it is cut into proper length for either stay bolts or track bolts as the case may be. If for stay bolts, it would be of stay bolt metal, whereas if it were for track bolts as shown in Fig. 5, it would be of steel.

To make a stay bolt, say for instance of the type shown in Fig. 4, a section of proper length is heated at its two ends 8ª to a welding heat, and forged and upset to produce the enlarged heads, after which the shank is twisted and the ends threaded and drilled.

For track bolts, the bar is cut into section, and heated at one end to permit the head 9 to be upset. The free end of the section is then heated to a mellow sweating heat and pinched together to weld or close the slots at said end, and while the bolt is still hot, it is twisted, and after it has cooled the end is threaded.

Instead of rolling the blank to produce a body 4 having parallel side faces and two side wings with parallel faces, as shown in pass 2 of Fig. 6, the body may be rolled into cylindrical shape as in Fig. 8, or it may have its wings tapering from the body outwardly as in Fig. 9, as my invention is broadly to the process of rolling the slab to produce a body and side wings of any shape and subsequently bending the side wings onto the body and into cylindrical form, thus producing a blank of three integral sections separated from one another through a part of their contacting or adjacent surfaces.

It is therefore evident that many slight changes may be resorted to in the method of producing the slotted shank of the bolt, hence I would have it understood that I do not confine myself to the particular sequence of steps shown nor to the particular form or shape of the body or wings of the blank but consider myself at liberty to make such changes as may fairly fall within the scope of my invention as defined by the appended claims.

Having fully described my invention what I claim as new and desire to secure by Letters-Patent, is:

1. The method of making blanks for flexible bolts consisting in shaping a bar between rolls to produce a body and two oppositely disposed side wings, bending the side wings onto the body and rolling the whole into cylindrical shape.

2. The method of making blanks for flexible bolts consisting in shaping a rectangular bar between rolls to produce a body and two opposingly disposed side wings, bending the side wings over onto the body and rolling the bar into cylindrical form without welding the contacting faces of the body and wings.

3. The method of making blanks for flexible bolts consisting in shaping a rectangular bar between rolls to produce a body and two oppositely disposed side wings, rolling the outer face of each side wing into the arc of a circle, bending said side wings against the opposite faces of the body and rolling the rod thus formed into cylindrical form.

4. The method of making bolts consisting in rolling a rectangular bar between rolls to produce a body and two side wings, bending the side wings onto the body and rolling the bar into cylindrical shape, cutting said bar into sections, welding the ends of each section and upsetting one end to form a head, twisting the shank of the bolt and then threading the same.

In testimony whereof, I have signed this specification in the presence of two subscribing witnesses.

ETHAN I. DODDS.

Witnesses:
F. H. ALLISON,
JOHN M. RONEY.

Copies of this patent may be obtained for five cents each, by addressing the "Commissioner of Patents, Washington, D. C."